United States Patent Office 2,841,519
Patented July 1, 1958

2,841,519
BISISOPROPOXYCARBONYL ETHYLENEBISDI-THIOCARBAMATE

Chien-Pen Lo and W E. Craig, Philadelphia, Pa., assignors to Rohm & Haas Company, Philadelphia, Pa., a corporation of Delaware No Drawing. Application January 19, 1956
Serial No. 560,071

3 Claims. (Cl. 167—22)

This invention concerns bisisopropoxycarbonyl ethylenebisdithiocarbamate, its preparation, and its employment against fungi which attack plants containing chlorophyll.

Bisethoxycarbonyl ethylenebisdithiocarbamate has been indicated in the literature as an unstable compound. We repeated the preparation of this compound and also prepared bismethoxycarbonyl, bis-n-propoxycarbonyl, and bis-n-butoxycarbonyl ethylenebisdithiocarbamate. All of these proved to be unstable even at room temperature, forming red gums in relatively short periods of time. We have also made some of the 1,2-propylene homologues and the bis-2-octyloxycarbonyl ethylenebisdithiocarbamate. These, too, are lacking in stability.

In contrast to these compounds, we discovered that bisisopropoxycarbonyl ethylenebisdithiocarbamate is stable. Samples have been stored for periods of time of the order of several years without evidence of decomposition. Bisisopropoxycarbonyl ethylenebisdithiocarbamate is useful for combatting pathogenic fungi which attack green plants or one or more organs thereof.

Bisisopropoxycarbonyl ethylenebisdithiocarbamate can be prepared by reacting isopropyl chloroformate and a soluble salt of ethylenebisdithiocarbamic acid, particularly an alkali metal salt. The reaction may conveniently be effected in a solvent. Temperatures of reaction are desirably kept low, and we usually work below 25° C. A range of −5° to 15° C. is preferred.

For example, 239 parts by weight of isopropyl chloroformate is slowly added to 1640 parts of an aqueous 15.6% disodium ethylenebisdithiocarbamate solution with stirring and cooling to keep the temperature below 15° C. The mixture is then stirred for about an hour at about 15° C. A white precipitate forms. It is filtered off, washed with a mixture of water and acetone, and air dried. There is obtained a product amounting to 356 parts by weight and corresponding in composition to bisisopropoxycarbonyl ethylenebisdithiocarbamate. It melts at 129°–130° C.

This compound is stable in contact with ordinary metal surfaces, such as stainless steel. It can thus be prepared in apparatus composed of or containing such a metal.

In standard fungitoxicity tests, wherein the inhibition of germination of spores of Stemphylium sarcinaeforme and of Monilinia fructicola is studied on plates, this compound was found to have an $LD_{50}$ value of 5–10 p. p. m. It was found that this compound was peculiar in that it was fungicidally active in the vapor phase. It was non-toxic to tomato plants when applied thereto at a concentration of one percent.

It was found to be effective against most of the soil-borne fungi which attack plants. It can be applied to soil as a drench or mixed with soil to protect the underground organs of plants.

An aqueous dispersion with 10 p. p. m. of the above compound was applied as a drench and found to control Sclerotinia sclerotiorum (stem rot of soya beans and sclerotinia wilt of beans), Pythium aphanidermatum (pythium root rot of cucurbits), Phytophthora citrophthora (fruit rot of citrus trees), and other fungi. At 100 p. p. m., it also controlled Sclerotinia rolfsii (southern blight of legumes), Pythium ultimum (root rot of muskmelon, seedling blight of lettuce, pear, corn, etc.), Phytophthora cinnamomi (phytophthora root disease of avocado, pineapple, and chestnut), and Phytophthora cactorum (rot rot of clover), and others, when mixed with soil at a rate of 200 lbs. per acre-six inches.

In preparing a dust for applying to foliage or mixing with soil the compound may be mixed at 5% to 10% with inert finely divided solids, such as a neutral or acid clay or talc. A dispersing agent and/or wetting agent may be used, if desired.

Mixtures with such agents may be prepared for use as wettable powders; for example, 25 parts of the above compound, 70 parts of a clay (with a pH of 6), one part of condensed naphthalene-formaldehyde sodium sulfonate, and four parts of a mixture of 25% tert-octylphenoxypolyethoxyethanol wetting agent and 75% magnesium carbonate. Such a wettable powder may be extended with additional inert solids to provide dusts or may be diluted with water to provide sprays, dilutions of compound of 1 to 400 to 1 to 3200 or even more being applied to plants.

Solutions of the above compound in a water-miscible organic solvent, such as acetone or dimethylformamide, may also be made for dilution with water. Wetting and sticking agents may be used in conjunction therewith, at least in the water which is generally used to dilute the solvent solution.

Also, the above compound can be used in conjunction with other fungicides or with insecticides or other kinds of pesticides, provided these are not basic.

A remarkable property of isopropoxycarbonyl ethylenebisdithiocarbamate is that not only does the compound itself appear to provide fungistatic and fungicidal action, but also compounds which are formed therefrom as the compound is exposed to the action of air, light, and moisture.

The compound of this invention may also be applied to plants in the form of seeds. For this purpose, it may be applied in finely divided form by itself or in a dust in which it is diluted with inert solids.

Thus, bisisopropoxycarbonyl ethylenebisdithiocarbamate can be used for protecting plants from pathogenic fungi by applying it directly thereto, or by supplying it to the environment thereof in amounts which provide at least fungistatic action. The compound is particularly desirable for combatting pathogens which incite disease of underground origin of numerous and diverse agricultural crops, including one more of the following root rots of bean, peas, melon, cucumber, squash, potato, pepper ornamentals, sugar beet, alfalfa, grains, citrus, avocado, or deciduous fruit trees, crown rot of celery, lettuce, or citrus, or vascular wilts of tomato, pepper, or small fruits or berries.

We claim:
1. As a new chemical compound, bis(isopropoxycarbonyl) ethylenebisdithiocarbamate.
2. A process for controlling fungi which attack plants which comprises supplying to a fungus-infected environment thereof bis(isopropoxycarbonyl) ethylenebisdithiocarbamate.

3. A process for controlling pathogenic fungi which attack green plants and which occur in soil which comprises supplying to a fungus-infected environment of the underground portion of said plants bis(isopropoxycarbonyl) ethylenebisdithiocarbamate.

References Cited in the file of this patent

UNITED STATES PATENTS

| 2,317,765 | Hester et al. | Apr. 27, 1943 |
| 2,541,678 | Swaney et al. | Feb. 13, 1951 |
| 2,796,376 | Williams et al. | June 18, 1957 |

OTHER REFERENCES

Kerk et al.: Rec. Trav. Chim. 71, pp. 1179–97 (1952).